R. D. ERNEST.
AUTOMATIC STARTER AND CONTROLLER.
APPLICATION FILED MAY 18, 1920.
Reissued Jan. 3, 1922.
15,258.
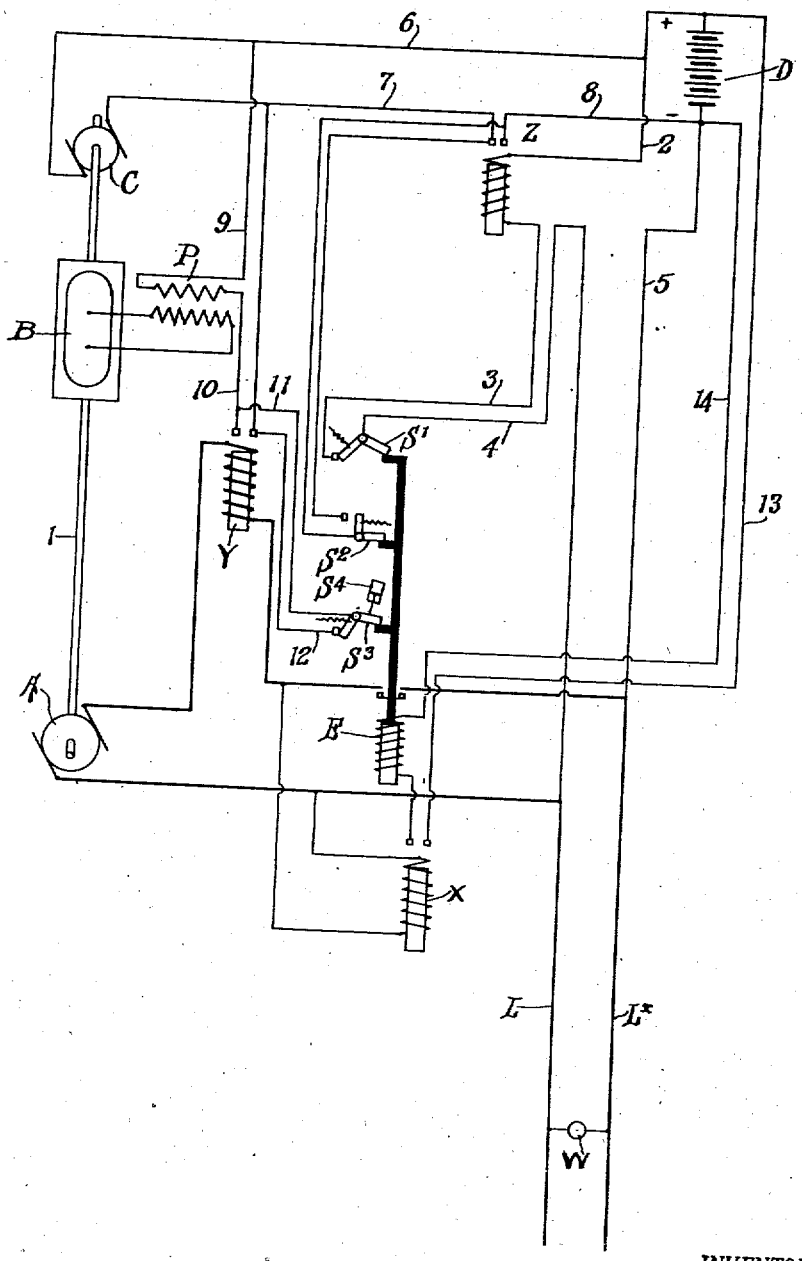
INVENTOR.
Ralph D. Ernest,
BY Toulmin & Toulmin,
ATTORNEYS.

UNITED STATES PATENT OFFICE.

RALPH D. ERNEST, OF DETROIT, MICHIGAN, ASSIGNOR, BY MESNE ASSIGNMENTS, TO B. A. LINDERMAN, OF CHICAGO, ILLINOIS.

AUTOMATIC STARTER AND CONTROLLER.

15,258. Specification of Reissued Letters Patent. Reissued Jan. 3, 1922.

Original No. 1,273,798, dated July 23, 1918, Serial No. 126,478, filed October 19, 1916. Application for reissue filed May 18, 1920. Serial No. 382,396.

*To all whom it may concern:*

Be it known that I, RALPH D. ERNEST, a citizen of the United States of America, residing at Detroit, in the county of Wayne and State of Michigan, have invented new and useful Improvements in Automatic Starters and Controllers, of which the following is a specification.

My invention relates to improvements in electrical automatic starters and controllers, and it consists in the combinations, constructions and arrangements herein described and claimed.

An object of my invention is to provide a device to be used in connection with gas, gasolene or oil driven electric generating sets, the purpose being to operate the said generating sets in such a way as to provide current at the proper voltage when there is a demand for the same, and to immediately stop the generating of current when there is no demand for power.

A further object of my invention is to reduce and minimize the use of a storage battery in connection with the improved apparatus, as distinguished from the present well-known practice of using heavy-duty or relatively powerful batteries in connection with electrical apparatus of this character.

In the present invention the battery is relied upon only for current to start the motor or generating system, and is cut-out or eliminated from the operating circuit as soon as the line circuit is established which is then supplied with current direct from the generator.

Thus a light-duty battery only is required instead of heavy-duty batteries as used in present common practice. This is an important and far reaching improvement. It minimizes the use and relative importance of the battery in the system as a whole and, therefore, makes for effectiveness and dependability of operation, as storage batteries are at best more or less inefficient and short lived in heavy-duty service.

The improvement relative to the battery also effects material savings in cost of construction, and more especially in the cost of maintenance as heavy-duty batteries are expensive in all respects as to first cost, maintenance and replacement costs.

Other objects and advantages will appear in the following specification, and the novel features of the invention will be pointed out in the appended claims.

My invention is illustrated in the accompanying drawing, which is a diagrammatic view of the various parts and their circuit connections.

In the practice of my invention, a generator A is provided which may be a direct-current, shunt, or compound-wound generator of any suitable voltage. The generator, as here shown, is connected directly to and driven by a gas engine B, here shown for illustrative purposes as a single-cylinder engine. It will be understood, of course, that an engine of any suitable capacity and type may be used in the system. An automatic or "self-starter" C is geared directly to the common shaft 1 of the starter, motor and generator, and a battery D is provided to furnish current for starting the motor and the ignition circuit. The capacity of the battery and starter, as here shown for illustrative purposes, in their assumed relation with the other devices should each be about 12 volts.

The invention is here shown as applied to a line circuit L—L$^{\times}$. The electrical automatic controlling devices consist of a single-pole, solenoid-operated circuit breaker E, three relays X—Y and Z and three switches S′, S$^2$ and S$^3$, the operation of the switch S$^3$ being retarded by any suitable means such as a dash-pot S$^4$ for reasons which will presently be described.

Relay X controls the operation of the circuit breaker. It is a potential relay and operates at a few volts under normal working voltage, which in this case is about 105 volts. Relay Y is a current relay in series with the generator. It controls together with the auxiliary switch S$^3$, the ignition circuit to the engine. This relay is arranged to open when the current flowing in the generator mains falls below a predetermined minimum, thus opening the ignition circuit. The relay Z is a current relay in series with the switch S′, the battery, and the mains L and L$^{\times}$, and is used to control the starting circuit.

The operation of the device will best be understood by takng up the steps in the order in which they actually occur. Let us assume that the generator is standing at rest or inoperative, the relays X, Y and Z are open. The circuit breaker E, as will be seen from the drawing, is in such position as to close the switches S′ and $S^3$, and to open the switch $S^2$. There is therefore a 12 volt pressure on the circuit mains L and $L^x$ from the battery. Suppose now a 25 watt lamp, such as that shown at W is switched on, this will cause a current to flow from the battery D through wire 2, relay Z, wire 3, switch S′, wire 4, through one of the mains L, then through the lamp W to the other main $L^x$ and back to the battery by the wire 5.

The operation of the relay Z will close the circuit from the battery D through a wire 6,—through the starter C, wire 7, contacts of the relay Z through the wire 8 back to the battery. The ignition circuit will also be closed, the current flowing from the battery D through wire 6, wire 9, primary P of the induction coil, wire 10, wire 11, switch $S^3$, wire 12, wire 7, contacts of relay Z, wire 8, back to the battery.

The engine is now started. As speed increases, the voltage of the generator will increase, exerting a pressure on relay X which will operate at about 105 volts. The closing of the contacts of the relay X energizes the coil of the circuit breaker over the following path; from battery D, through wire 13, contacts of the relay X, coils of the circuit breaker E and back by wire 14 to the battery. The operation of the circuit breaker in closing, opens the auxiliary switches S′ and $S^3$, and closes the auxiliary switch $S^2$. The switch $S^3$ is slightly retarded due to its time element, in order to allow time to energize the relay Y, by the current flow due to the closing of the circuit breaker. The auxiliary switch $S^3$ is thus open during normal running, which gives relay Y complete control over the ignition circuit. The relay Z is protected from the generator voltage by the opening of the auxiliary switch S′. The closing of the auxiliary switch $S^2$ closes the circuit between the starting motor-generator and the battery, allowing the starting motor, now a generator, to charge the battery in addition to furnishing current for ignition and for operating the circuit breaker solenoid.

Let us now consider the effect when all the lamps are turned off, causing the current in the generating circuit to decrease to a minimum. Relay Y having no current to energize it will open and break the ignition circuit, causing the engine to stop. As the speed falls off, the generator voltage will fall off and at 105 volts, the circuit breaker will open and will restore the auxiliary switch S′ to a closed position, thereby completing the circuit through the relay Z as far as the circuit mains, ready for starting. The opening of the circuit breaker opens auxiliary switch $S^2$ before the starting motor-generator voltage falls low enough to begin to take power from the battery. The auxiliary switch $S^3$ tends to close, but is retarded in doing so long enough to allow the engine to stop before closing, as otherwise ignition would be restored and the engine would start up again.

It will be seen that the operation of the generating sets is controlled by the condition of the load on the circuit mains, and obeys the call for energy instantly. One has only to close the switch to cause the generator to be started and furnish the power required, and on the other hand, one has only to open the switch to stop the whole system.

Having thus fully described my invention, what I claim as new and desire to secure by Letters Patent, is:—

1. The combination, of an internal combustion engine, having electric igniters, an electric starter for said engine, a generator driven by the engine, a battery, a work circuit, said battery having normal connections with said work circuit, a relay operated by the battery current for controlling the ignition circuit and the electric starter, a relay in the work circuit for opening or closing the ignition circuit, a circuit breaker for opening and closing said work circuit, a switch for controlling the battery circuit, a switch for controlling the charging circuit, and a switch for partially controlling the ignition circuit, all of said switches being operated by said circuit breaker.

2. The combination of an internal combustion engine, having electric igniters, an electric starter for said engine, a generator driven by the engine, a battery, a work circuit, said battery having normal connections with said work circuit, a relay operated by the battery current for controlling the ignition circuit and the electric starter, a relay in the work circuit for opening and closing said ignition circuit, a circuit breaker for opening and closing said work circuit, a switch for controlling the battery circuit, a switch for controlling the charging circuit, and a time retarded switch for partially controlling the ignition, all of said switches being operated by said circuit breaker, and a relay across the main circuit and operated at predetermined voltage for controlling the circuit breaker of the generator.

3. The combination of an internal combustion engine, having electric igniters, an electric starter for said engine, a generator driven by the engine, a battery, a work circuit, said battery having normal connections with the said work circuit, a relay operated by the battery current for controlling the ignition circuit and the electric starter, a relay in the work circuit for opening and closing said ignition circuit, a circuit breaker for opening and closing said work circuit, a switch for controlling the battery circuit, a quick acting switch for controlling the charging circuit and a time retarded switch for partially controlling the ignition circuit, all of said switches being operated by the said circuit breaker, and a relay across the main circuit and operated at a predetermined voltage for controlling the circuit breaker of the generator.

4. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a relay operated by the battery current for controlling the starter and ignition circuits in starting operation of said system, a controlling device acting to close the work circuit and to cut out the battery from the work circuit and a relay for controlling the ignition circuit when said system is in full operation after the controlling device has acted.

5. In an electrical automatic control system, the combination, with an internal combustion engine having electrical igniters, an electrical starter for said engine, a generator driven by the engine, and a work circuit supplied with electrical current from the generator; of a battery normally in circuit with the work circuit when said system is inoperative, a relay operated by the battery current for controlling the starter and ignition circuits in starting operation of said system, a controlling device acting to close the work circuit and to cut out the battery from the work circuit when the system enters upon full operation, and a relay in the work circuit for controlling the ignition circuit while said system is so operating.

6. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a relay operated by the battery current for controlling the starter and ignition circuits in starting operation of said system, a controlling device operable by a relay across the work circuit to close the work circuit and to cut out the battery from the work circuit when the system enters upon full operation, and a relay in the work circuit for controlling the ignition circuit while said system is so operating.

7. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a relay operated by the battery circuit for controlling the starter and ignition circuits in starting operation of said system, a controlling device operable by a relay across the work circuit to close the work circuit and to cut out the battery from the work circuit when the system enters upon full operation, and a relay in the work circuit responsive to said device and acting to control the ignition circuit when said system is so operating.

8. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a relay operated by the battery current for controlling the starter and ignition circuits in the starting operation of said system, a relay in the work circuit acting to control the ignition circuit when said system is in full operation, and a controlling device acting to close the work circuit and cooperating with a plurality of switches, respectively, to cut out the battery from the work circuit, to close the battery charging circuit and to assist in the establishment of the main ignition circuit.

9. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a relay operated by the battery current for controlling the starter and ignition circuits in starting operation of said system, a relay in the work circuit acting to control the ignition circuit when said system is in full operation, and a controlling device operable through a relay across the work circuit to close the work circuit and cooperating with a plurality of switches, respectively, to cut out the battery from the work circuit, to close the battery charging circuit, and to assist in the establishment of the main ignition circuit.

10. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a relay operated by the battery current for controlling the starter and ignition circuits in starting operation of said system, a relay in the work circuit acting to control the ignition circuit when said system is in full operation, and a circuit breaker operable through a potential relay across the work circuit to close the work circuit and cooperating simultaneously with a plurality of switches, respectively, to cut out the battery from the work circuit, to close the battery charging circuit and to assist in the establishment of the main ignition circuit.

11. In an electrical automatic control system, the combination, with an internal combustion engine having electrical igniters, an electrical starter for said engine, a generator driven by the engine, and a work circuit supplied with electrical current from the generator, of a battery normally in circuit with the main circuit when said system is inoperative, a relay operated by the battery current for controlling the starter and ignition circuits in starting operation of said system, a relay in the work circuit acting to establish an ignition circuit through the starting generator and to control the same when the system is in full operation, and a circuit breaker controlling said work circuit relay and acting to close the work circuit and to cut out the battery from the work circuit when said system is so operating.

12. In an electrical automatic control system, the combination, with an internal combustion engine having electrical igniters, an electrical starter for said engine, a generator driven by the engine, and a work circuit supplied with electrical current from the generator, of a battery normally in circuit with the work circuit when said system is inoperative, a battery charging circuit, a relay operated by the battery current for controlling the starter and ignition circuits in starting operation of said system, a relay in the work circuit acting to establish an ignition circuit through the starting generator and to control the same when the system is in full operation, and a circuit breaker controlling said work circuit relay and acting through a plurality of quick-acting switches to respectively cut out the battery from the work circuit, to establish the battery charging circuit, and through a time retarded switch to assist said work circuit relay to establish said main ignition circuit.

In testimony whereof I affix my signature.

RALPH D. ERNEST.